T 860,018

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1008

772,435

AQUEOUS WAX DISPERSIONS

Marion O. Brunson, Bracksville, Ohio (% Tennessee Eastman Company, P.O. Box 511, Kingsport, Tenn. 37662)

Continuation of application Ser. No. 654,359, July 19, 1967. This application Oct. 31, 1968. Published Mar. 25, 1969

Class 260—27

No Drawing. 15 Pages Specification

An aqueous wax composition containing an emulsifiable, low viscosity, modified polyethylene composition. The polyethylene composition has a saponification number of at least 6, a melt viscosity of 250–15,000 centipoise at 150° C. and an inherent viscosity of about .1 to about .5. The modified polyethylene composition is prepared by reacting a low viscosity crystallizable polyethylene having an inherent viscosity of about .1 to about .5 with an unsaturated polycarboxylic acid, an unsaturated polycarboxylic acid anhydride or an unsaturated polycarboxylic acid ester at a temperature of 200 to 400° C. Additional materials which can be included in the wax composition are bleached dewaxed shellac, maleic modified rosin and an acrylic interpolymer. The aqueous wax dispersion contains from about 10 to 40% by weight solids and finds use as a floor polishing composition.